United States Patent
Nemethy et al.

(10) Patent No.: US 7,310,606 B2
(45) Date of Patent: Dec. 18, 2007

(54) METHOD AND SYSTEM FOR GENERATING AN IMAGE-TEXTURED DIGITAL SURFACE MODEL (DSM) FOR A GEOGRAPHICAL AREA OF INTEREST

(75) Inventors: Joseph M. Nemethy, West Melbourne, FL (US); John A. Van Workum, Melbourne, FL (US); Shayan K. Sarkar, Washington, DC (US); John P. Karp, Indialantic, FL (US); David W. Dubois, Melbourne, FL (US); David M. Bell, Palm Bay, FL (US); Robert A. Killam, Melbourne, FL (US); Thomas J. Appolloni, Melbourne, FL (US); Joseph A. Venezia, Orlando, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 11/383,008

(22) Filed: May 12, 2006

(65) Prior Publication Data

US 2007/0265781 A1 Nov. 15, 2007

(51) Int. Cl.
*G06F 19/00* (2006.01)
(52) U.S. Cl. .................... 705/5; 345/419; 345/428; 345/581; 345/582; 345/630
(58) Field of Classification Search ............... 345/419, 345/420, 421, 428, 581, 583, 619, 621, 625, 345/629, 630, 418, 582, 620; 382/100, 108, 382/154, 254, 266, 276, 284, 285; 702/5
See application file for complete search history.

(56) References Cited

U.S. PATENT DOCUMENTS 3,060,596 A * 10/1962 Tucker et al. ................. 434/43
3,432,674 A * 3/1969 Hobrough ................... 250/558
3,441,789 A * 4/1969 Lee .............................. 345/12
3,454,822 A * 7/1969 Lee ............................ 315/378

(Continued)

FOREIGN PATENT DOCUMENTS

JP 10-132931 A * 5/1998

OTHER PUBLICATIONS

Smith et al., *Quick-Take Reviews: Visual Nature Studio 2*, GEO World, Apr. 2004, available at www.geoplace.com.

(Continued)

*Primary Examiner*—Edward R Cosimano
(74) *Attorney, Agent, or Firm*—Allen, Dyer, Doppelt, Milbrath & Gilchrist, P.A.

(57) ABSTRACT

A computer-implemented method for generating an image-textured digital surface model (DSM) for a geographical area of interest including both buildings and terrain may include using a computer to generate a digital elevation model (DEM) of both the buildings and terrain for the geographical area of interest. The method may further include providing a collection of optical images including oblique optical images for the geographical area of interest including both buildings and terrain. The computer may also be used to selectively superimpose oblique optical images from the collection of optical images onto the DEM of both the buildings and terrain for the geographical area of interest and to thereby generate the image-textured DSM for the geographical area of interest including both buildings and terrain.

14 Claims, 6 Drawing Sheets

U.S. PATENT DOCUMENTS

| | | | |
|---|---|---|---|
| 6,166,744 A * | 12/2000 | Jaszlics et al. | 345/629 |
| 6,215,503 B1 * | 4/2001 | Snyder et al. | 345/629 |
| 6,229,546 B1 * | 5/2001 | Lancaster et al. | 345/419 |
| 6,266,064 B1 * | 7/2001 | Snyder | 345/421 |
| 6,654,690 B2 | 11/2003 | Rahmes et al. | 702/5 |
| 6,922,703 B1 | 7/2005 | Snyder et al. | 707/104.1 |
| 6,965,846 B2 | 11/2005 | Krimmer | 703/2 |
| 7,003,400 B2 * | 2/2006 | Bryant | 702/5 |
| 7,034,821 B2 * | 4/2006 | Baumberg | 345/419 |
| 7,164,883 B2 * | 1/2007 | Rappaport et al. | 455/3.01 |
| 2001/0027456 A1 * | 10/2001 | Lancaster et al. | 707/104.1 |
| 2003/0023412 A1 * | 1/2003 | Rappaport et al. | 703/1 |
| 2003/0218607 A1 * | 11/2003 | Baumberg | 345/419 |
| 2004/0075697 A1 * | 4/2004 | Maudlin | 345/848 |
| 2005/0031197 A1 | 2/2005 | Knopp | 382/154 |
| 2005/0090988 A1 * | 4/2005 | Bryant | 702/14 |
| 2005/0271264 A1 | 12/2005 | Ito et al. | 382/154 |
| 2006/0239539 A1 * | 10/2006 | Kochi et al. | 382/154 |
| 2007/0064005 A1 * | 3/2007 | Antoine | 345/473 |
| 2007/0067106 A1 * | 3/2007 | Antoine | 702/5 |

OTHER PUBLICATIONS

*InReality™: Intelligence in 3-D . . . InReality™*, Harris Corporation, 1998-2004.

*Tecplot: Tecplot Tips-Strategies for Applying Texture Mapping to Digital Elevation Map (DEM) Files*, Contours, Sep. 2003, Issue 21.

* cited by examiner

METHOD AND SYSTEM FOR GENERATING AN IMAGE-TEXTURED DIGITAL SURFACE MODEL (DSM) FOR A GEOGRAPHICAL AREA OF INTEREST

FIELD OF THE INVENTION

The present invention relates to the field of topography, and, more particularly, to automated methods and related systems for generating topographical models.

BACKGROUND OF THE INVENTION

Topographical models of geographical areas may be used for many applications. For example, topographical models may be used in flight simulators and for planning military missions. Furthermore, topographical models of man-made structures (e.g., cities) may be extremely helpful in applications such as cellular antenna placement, urban planning, disaster preparedness and analysis, and mapping, for example.

Various types and methods for making topographical models are presently being used. One common topographical model is the digital elevation map (DEM). A DEM is a sampled matrix representation of a geographical area which may be generated in an automated fashion by a computer. In a DEM, coordinate points are made to correspond with a height value. DEMs are typically used for modeling terrain where the transitions between different elevations (e.g., valleys, mountains, etc.) are generally smooth from one to a next. That is, DEMs typically model terrain as a plurality of curved surfaces and any discontinuities therebetween are thus "smoothed" over. Thus, in a typical DEM no distinct objects are present on the terrain.

On the other hand, a digital surface model (DSM) is a raster-based description of the terrain that includes objects on the terrain, such as buildings and vegetation. One approach for generating DSMs is to render objects manually or semi-automatically, and then add texture by manually "painting" the objects or superimposing imagery thereon. While this approach may provide a very realistic looking DSM of the area of interest, this approach is very labor intensive and thus cost prohibitive for many applications.

Other approaches have been attempted to generate textured DEMs using more automated (i.e., less labor intensive) approaches. One such approach is outlined in an E-Newsletter article entitled "Contours" from Tecplot, Inc., Issue 21, September 2003 (available at tecplot.com/showcase/contours/issue_21/article04.htm). This article discusses using Tecplot software to apply texture mapping to DEM files. More particularly, the article discusses how Tecplot may be used to texture map a single nadir image to a DEM.

While this approach may provide fairly realistic texturing for DEMs of relatively undeveloped terrain, this approach may not provide desired results for geographical areas of interest, such as cities, which include a large number of manmade objects. This is because buildings, towers, etc., have many different sides, and the features on the sides of such objects may not be adequately captured by a single nadir image.

One particularly advantageous 3D site modeling product is RealSite® from the present Assignee Harris Corp. The RealSite® site modeling product may be used to register overlapping images of a geographical area of interest, and extract high resolution DEMs using stereo and nadir view techniques. The RealSite® site modeling product renders 3D models of buildings (i.e., manmade structures) based upon manual operator selection of object vertices, shapes, etc., and these models are overlayed at the appropriate positions on a DEM. Various types of polygonal shapes may then be overlayed on the modeled objects, and images with the best collection angle for each polygon are automatically selected as a texture map based upon an obscuration test.

While the RealSite® site modeling product provides extremely realistic 3D DSMs, this approach may not be appropriate for certain implementations because of the potentially high labor costs associated with manually defining numerous building vertices, shapes, etc. for large urban areas. That is, the high level of detail and crisp object delineation provided by the RealSite® site modeling product may be greater than is required in certain circumstances.

SUMMARY OF THE INVENTION

In view of the foregoing background, it is therefore an object of the present invention to provide an automated or computer-implemented method and system for generating image-textured digital surface models (DSMs) for geographical areas of interest.

This and other objects, features, and advantages are provided by a computer-implemented method for generating an image-textured digital surface model (DSM) for a geographical area of interest including both buildings and terrain (i.e., ground and/or vegetation). The method may include using a computer to generate a digital elevation model (DEM) of both the buildings and terrain for the geographical area of interest, and providing a collection of optical images including oblique optical images for the geographical area of interest including both buildings and terrain. The method may further include using the computer to selectively superimpose oblique optical images from the collection of optical images onto the DEM of both the buildings and terrain for the geographical area of interest and to thereby generate the image-textured DSM for the geographical area of interest including both buildings and terrain.

More particularly, using the computer to selectively superimpose may include using the computer to selectively superimpose the plurality of optical images onto the DEM based upon respective amounts of obscuration associated with each image at a given position. Additionally, using the computer to generate the DEM may include using the computer to generate continuous gridded data of elevation versus position conforming to a predetermined position grid. As such, using the computer to selectively superimpose may include using the computer to generate a plurality of polygons corresponding to the gridded elevation versus position data for the DEM, and selectively superimpose the oblique optical images within respective polygons.

By way of example, the polygons may be triangles. The predetermined position grid may include a plurality of spaced apart posts, and the polygons may have vertices positioned on the posts. Also, the posts may have a uniform spacing therebetween of less than about 100 cm, and the oblique optical images may have a resolution higher than about 20 cm, for example. Furthermore, the collection of optical images may further include at least one nadir optical image of the geographical area of interest including both buildings and terrain, and using the computer to generate the DEM may include using the computer to generate the DEM based upon the at least one nadir optical image and at least one of the plurality of oblique optical images. More specifically, the at least one nadir optical image may include a pair of stereo nadir optical images.

A computer system for generating an image-textured digital surface model (DSM) for a geographical area of interest including both buildings and terrain may include a database for storing a collection of optical images including oblique optical images for the geographical area of interest including both buildings and terrain. The system may further include a processor for generating a digital elevation model (DEM) of both the buildings and terrain for the geographical area of interest. The processor may also be for selectively superimposing oblique optical images from the collection of optical images onto the DEM of both the buildings and terrain for the geographical area of interest and to thereby generate the image-textured DSM for the geographical area of interest including both buildings and terrain.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
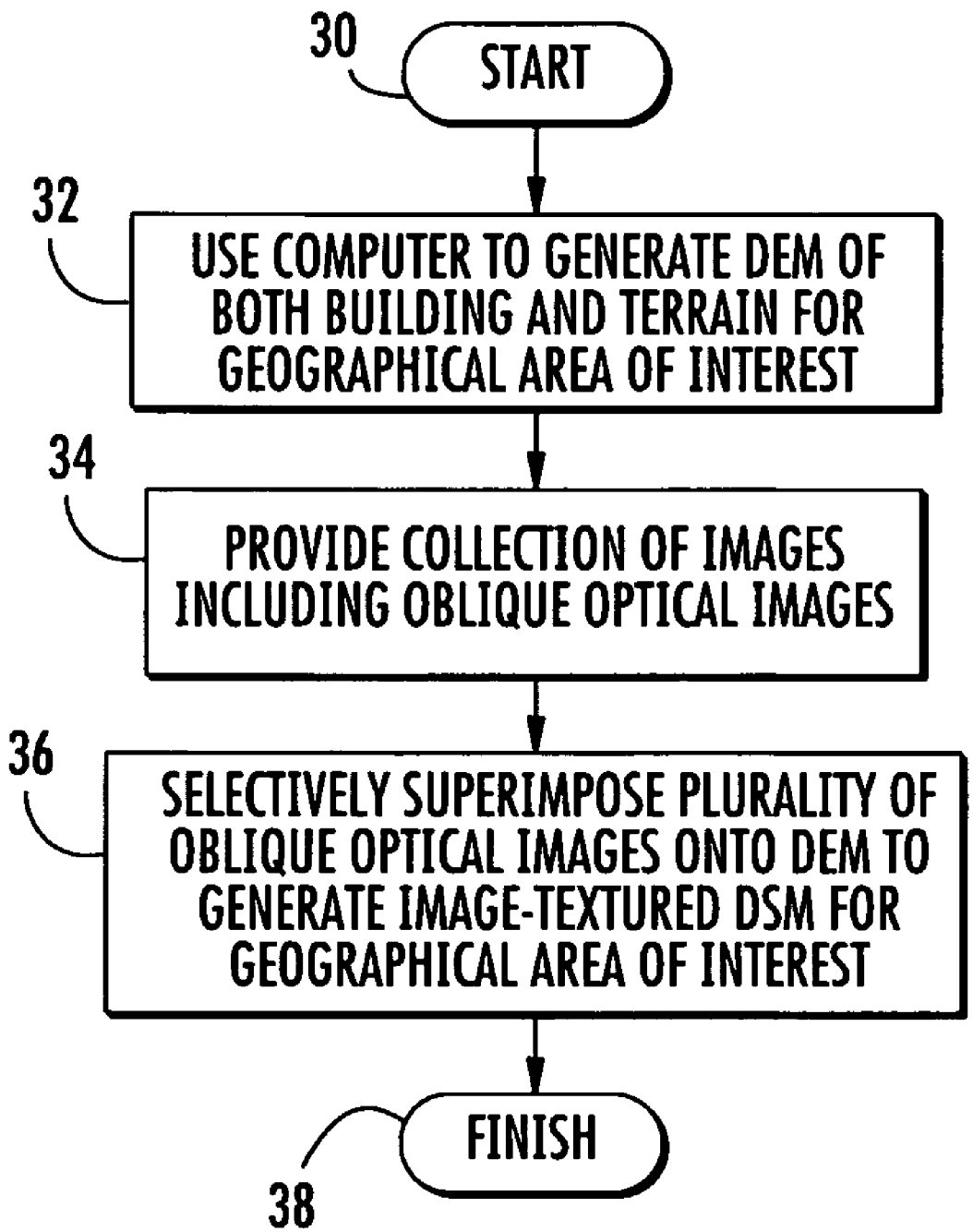
FIG. 1 is flow diagram of a method for generating an image-textured digital surface model (DSM) in accordance with the present invention.
Figure 2:
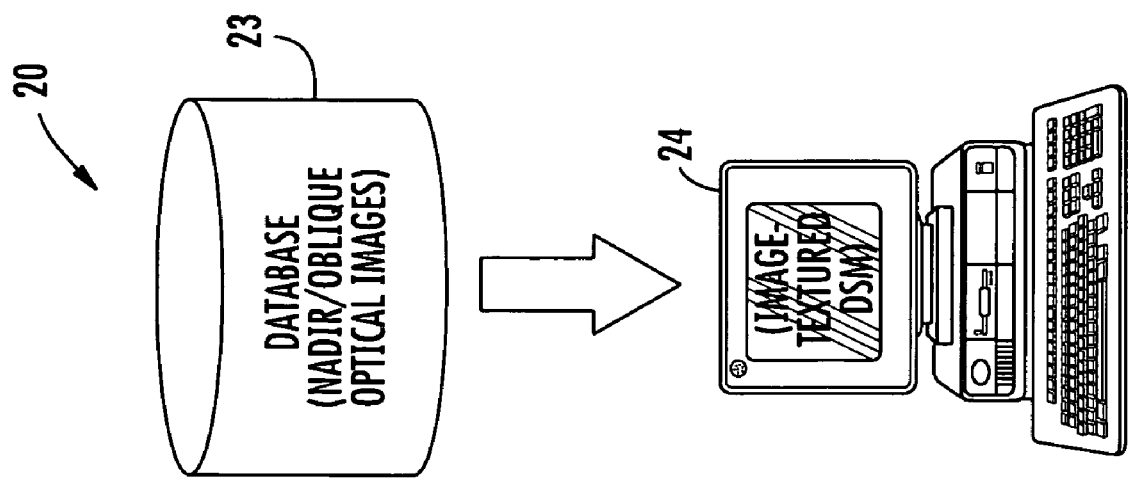
FIG. 2 is a schematic block diagram of a system for generating an image-textured digital surface model (DSM) in accordance with the present invention.
Figure 2:
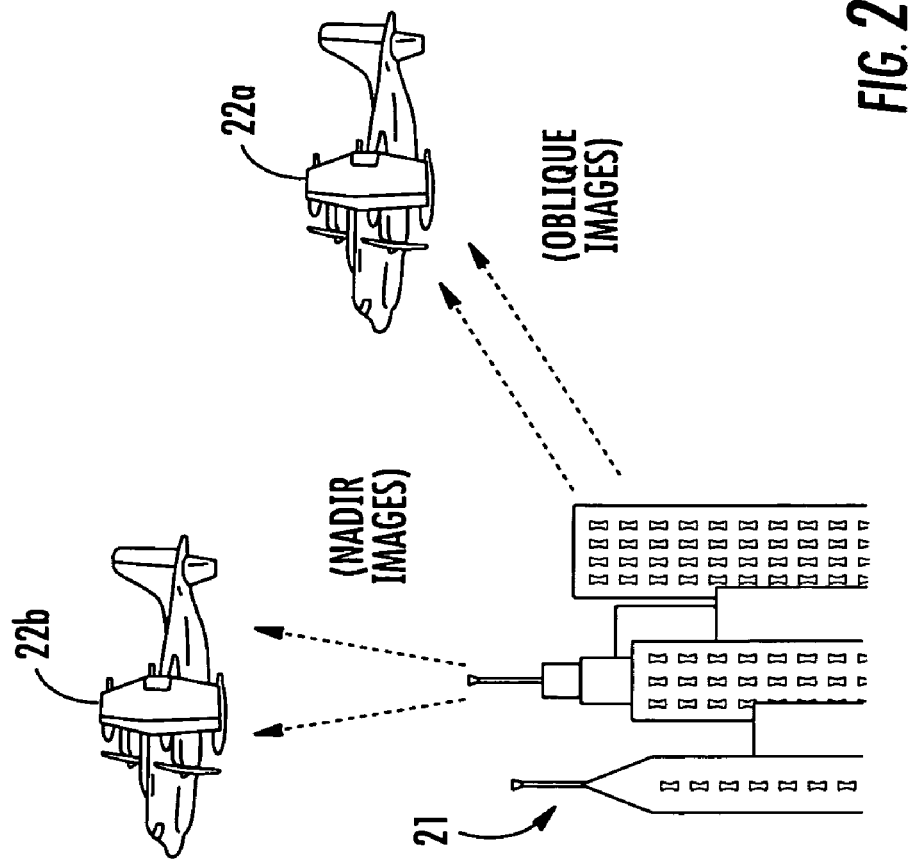
Figure 3:
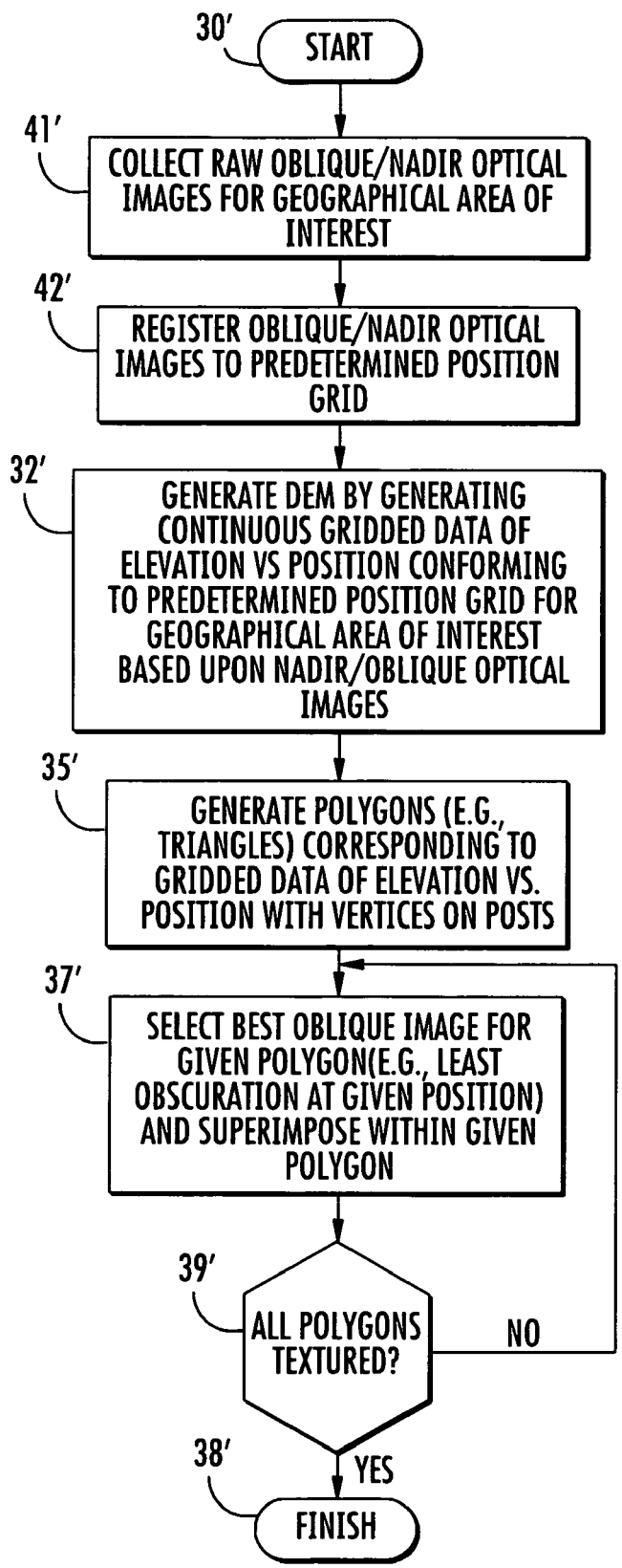
FIG. 3 is a flow diagram of an alternative embodiment of the method of FIG. 1.

Referring initially to FIGS. 1 through 3, a method and system 20 for generating an image-textured digital surface model (DSM) for a geographical area of interest 21 is first described. Beginning at Block 30, the method illustratively includes generating a digital elevation model (DEM) of both buildings and terrain for the geographical area of interest 21, as will be discussed further below, and providing a collection of optical images including oblique optical images for the geographical area of interest 21, at Blocks 32 (or 32' in FIG. 3), 34. In the illustrated example, the geographical area of interest 21 is a city which includes both buildings and terrain. As used herein, "building" means any manmade structure (e.g., houses, office buildings, storage tanks, warehouses, sports arenas, etc.). Moreover, "terrain" is meant to include ground and/or vegetation (e.g., trees, shrubs, forests, etc.) present in the geographical area of interest 21.

By way of example, the oblique optical images may be collected by one or more image collection devices carried by an airplane 22a at oblique angles relative to the area of interest 21 (i.e., relative to normal from the earth's surface), at Block 41'. Moreover, one or more nadir optical images may be taken from directly above the area of interest 21 and also included within the collection of images. In the illustrated example, this is done using one or more image collection devices carried by an airplane 22b.

Of course, it should be noted that other platforms beside airplanes may be used for collecting the nadir and/or oblique images of the area of interest 21 (e.g., satellites, blimps, mobile ground vehicles, etc.), or these images may be collected from predetermined locations around the area of interest, as will be appreciated by those skilled in the art. Stereo nadir images may be used to provide corresponding data pair combinations for the area of interest and, thus, enhanced accuracy, but single or mono nadir images may also be used. By way of example, the nadir and/or oblique optical images may preferably have a resolution higher than about 20 cm, for example, although other resolutions may also be used.

The oblique and nadir images collected by the airplanes 22a, 22b are initially "raw" in the sense that they are not correlated to one another or a common frame of reference (i.e., a grid). These raw images may be stored in a database 23, for example, for transfer to a processor 24 (e.g., a computer workstation CPU in the illustrated embodiment) for processing. Various methods of transferring the data from the collector to the database 23 may be used, such as magnetic storage media, FLASH devices, wireless data links, etc.

As will be appreciated by those skilled in the art, the position of a collection device at a given instant when it captures an image can be determined with a relatively high degree of accuracy using satellite positioning technology (e.g., GPS), altimeters, etc., for example. Thus, this position information can advantageously be used to correlate or register the raw images to a predetermined position grid (and thus to one another), as will also be appreciated by those skilled in the art (Block 42').

The grid may include a plurality of equally spaced-apart posts which define the density of the grid. That is, the farther apart the posts are spaced the lower the density of the grid (and thus the DEM created thereon), and vice-versa. By way of example, a preferred post spacing may be less than about 100 cm (i.e., the actual scene spacing), and, more preferably, less than about 70 cm, although other spacing may be used in different embodiments. It should be noted that the relationship between post spacing and image density is not linear, that is, decreasing the post spacing can result in an exponential increase in grid density, and thus an exponential increase in the density of the DEM. As such, the processing requirements for generating the DEM correspondingly increase with grid density, so in a given implementation the post spacing may be selected in part based upon desired DEM density and available processing resources, for example.

Figure 4:
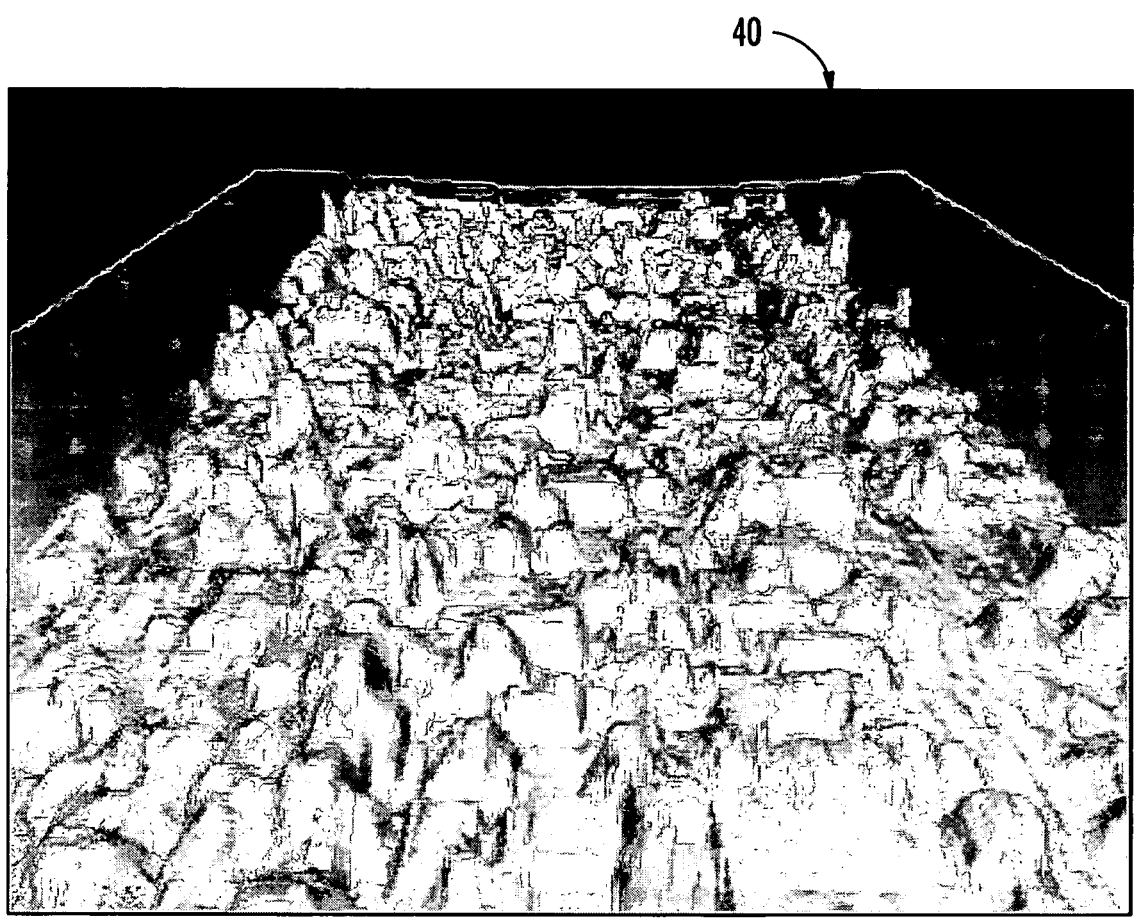
FIG. 4 is a computer screen print of a digital elevation model (DEM) used for generating an image-textured DSM in accordance with the invention.

Once correlated to the grid, the nadir image(s) may be used to determine an outline of object tops (e.g., rooftops), while one or more corresponding oblique images may be used to determine the position and height of the given object, as will be appreciate by those skilled in the art. The position and height data points may then be saved as a high resolution DEM of the area of interest 21, such as the DEM 40 illustrated in FIG. 4, at Blocks 32, 32'. The processor 24 may advantageously generate the DEM from the uploaded nadir/oblique optical images automatically based upon the parameters set by an operator on an appropriate software tool, as will also be appreciated by those skilled in the art. Of course, it should be noted that other approaches for generating the DEM may also be used. For example, the DEM may be generated using other types of data such as light detecting and ranging (LIDAR), synthetic aperture radar (SAR), electro-optical, infrared, hyperspectral, etc., as will also be appreciated by those skilled in the art.

Figure 5:
FIG. 5 is a computer screen print of the DEM of FIG. 4 after generating polygons corresponding thereto.
Figure 6:
FIGS. 6-9 are computer screen prints of an image-textured DSM in accordance with the invention from the north, south, east, and west directions, respectively.
Figure 7:
Figure 8:
Figure 9:
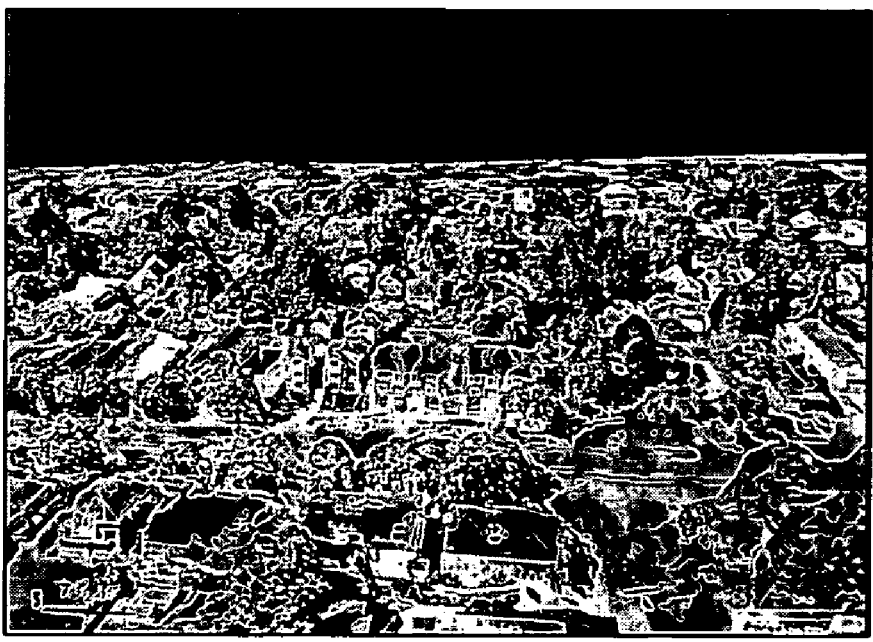

Generally speaking, the method further illustratively includes using the processor 24 to selectively superimpose the plurality of oblique optical images onto the DEM 40 to thereby generate the image-textured DEM for the geographical area of interest including the buildings and terrain, at Block 36. More particularly, a plurality of polygons 45, such as triangles, for example, are generated by the processor 24 which correspond to the gridded elevation versus position data for the DEM (FIG. 5) (Block 35'). That is, the vertices of the triangles are located at the same positions as the grid posts, but the respective heights of the vertices are equal to the height of the elevation of the DEM at those positions. Thus, the vertices of a given triangle (or other polygon shape) will often be at different heights.

Moreover, this determination may also be based upon the degree of obscuration each collector experiences with respect to the given position. That is, in a first image the collector may have been closer to the given position than in a second image, but its line of site in the first image to the given position may have been obscured by an intermediate object (building, tree, etc.). However, while the second image was taken from farther away from the given position, it may have had a relatively clear line of site to the given position (i.e., little or no obscuration), and would therefore be a better choice than the first image. Once all of the polygons are textured, at Block 39', the DSM is complete (Blocks 38, 38'). FIGS. 6-9 show respective north, south, east, and west portions 46-49 of a completed image-textured DSM generated from the DEM 40.

By way of example, the above-noted RealSite® 3D site modeling product may advantageously be used to perform certain of the above-outlined steps. For example, the RealSite® site modeling product may be configured to register the oblique/nadir optical images, perform DEM and polygon generating, and image-texture the polygons. However, it should be noted that in contrast to tradition DSMs generated with the RealSite® site modeling product, here the building elevation portions of a generated DEM may be automatically textured without any intervening user manipulation of the buildings. That is, building portions of a DEM may be automatically textured without the need to manually replace or render objects (e.g., cubes, pyramids, etc.) that replicate the original buildings, as will be appreciated by those skilled in the art. Of course, other suitable programs or applications may also be used.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A computer-implemented method for generating an image-textured digital surface model (DSM) for a geographical area of interest including both buildings and terrain, the method comprising:
   generating a digital elevation model (DEM) of both the buildings and terrain for the geographical area of interest using a computer;
   providing a collection of optical images including oblique optical images for the geographical area of interest including both buildings and terrain; and
   selectively superimposing, using the computer, oblique optical images from the collection of optical images onto the DEM of both the buildings and terrain for the geographical area of interest and based upon respective amounts of obscuration associated with each image at a given position to thereby generate the image-textured DSM for the geographical area of interest including both buildings and terrain for use in digital surface modelling.

2. The method of claim 1 wherein generating the DEM comprises using the computer to generate continuous gridded data of elevation versus position conforming to a predetermined position grid.

3. The method of claim 2 wherein the predetermined position grid comprises a plurality of spaced apart posts.

4. The method of claim 1 wherein the collection of optical images further comprises at least one nadir optical image of the geographical area of interest including both buildings and terrain; and wherein generating the DEM comprises using the computer to generate the DEM based upon the at least one nadir optical image and at least one of the plurality of oblique optical images.

5. The method of claim 4 wherein the at least one nadir optical image comprises a pair of stereo nadir optical images.

6. A computer-implemented method for generating an image-textured digital surface model (DSM) for a geographical area of interest including both buildings and terrain, the method comprising:
   generating a digital elevation model (DEM) of both the buildings and terrain for the geographical area of interest using a computer by generating continuous gridded data of elevation versus position conforming to a predetermined position grid;
   providing a collection of optical images including oblique optical images for the geographical area of interest including both buildings and terrain; and
   selectively superimposing oblique optical images from the collection of optical images onto the DEM of both the buildings and terrain for the geographical area of interest using the computer based upon respective amounts of obscuration associated with each image at a given position and to thereby generate the image-textured DSM for the geographical area of interest including both buildings and terrain for use in digital surface modelling by
      generating a plurality of polygons corresponding to the gridded elevation versus position data for the DEM, and
      selectively superimposing the oblique optical images within respective polygons.

7. The method of claim 6 wherein the polygons comprise triangles.

8. The method of claim 6 wherein the predetermined position grid comprises a plurality of spaced apart posts; and wherein the polygons have vertices positioned on the posts.

9. The method of claim 6 wherein the collection of optical images further comprises at least one nadir optical image of the geographical area of interest including both buildings and terrain; and wherein generating the DEM comprises using the computer to generate the DEM based upon the at least one nadir optical image and at least one of the plurality of oblique optical images.

10. The method of claim 9 wherein the at least one nadir optical image comprises a pair of stereo nadir optical images.

11. A computer system for generating an image-textured digital surface model (DSM) for a geographical area of interest including both buildings and terrain and comprising:
- a database for storing a collection of optical images including oblique optical images for the geographical area of interest including both buildings and terrain; and
- a processor for generating a digital elevation model (DEM) of both the buildings and terrain for the geographical area of interest, and for selectively superimposing oblique optical images from the collection of optical images onto the DEM of both the buildings and terrain for the geographical area of interest and based upon respective amounts of obscuration associated with each image at a given position to thereby generate the image-textured DSM for the geographical area of interest including both buildings and terrain for use in digital surface modelling.

12. The computer system of claim 11 wherein the collection of optical images further comprises at least one nadir optical image of the geographical area of interest including both buildings and terrain; and wherein said processor generates the DEM based upon the at least one nadir optical image and at least one of the plurality of oblique optical images.

13. The computer system of claim 11 wherein said processor generates the DEM by generating continuous gridded data of elevation versus position conforming to a predetermined position grid.

14. The computer system of claim 13 wherein said processor selectively superimposes the oblique optical images by:
- generating a plurality of polygons corresponding to the gridded elevation versus position data for the DEM; and
- selectively superimposing the oblique optical images within respective polygons.

* * * * *